United States Patent
Murray

[11] 3,648,643
[45] Mar. 14, 1972

[54] BOATING ACCESSORY

[72] Inventor: Jerome L. Murray, 652 First Avenue, New York, N.Y. 10016

[22] Filed: Jan. 22, 1970

[21] Appl. No.: 4,833

[52] U.S. Cl. ........................................................115/0.5 R
[51] Int. Cl. ...........................................................B63h 21/00
[58] Field of Search..................114/16.2, 126; 9/2 S, 1 A, 9/4; 137/525.1; 115/0.5, 0.5 A, 70

[56] References Cited

UNITED STATES PATENTS

| | | | |
|---|---|---|---|
| 316,139 | 4/1885 | Goldberg et al. | 191/12 R |
| 717,356 | 12/1902 | Cunningham | 114/0.5 |
| 3,060,882 | 10/1962 | Peters et al. | 137/525.1 X |
| 3,190,387 | 6/1965 | Dow | 180/65 |
| 3,259,926 | 7/1966 | Otterman | 9/4 |

*Primary Examiner*—Andrew H. Farrell
*Attorney*—Curtis, Morris & Safford

[57] ABSTRACT

A buoyant watertight boating accessory containing an alternator or generator and an internal combustion engine for driving the alternator is moored to a boat by a connecting line which includes the necessary electrical wiring to supply electricity from the alternator to electrical appliances on the boat. The air intake to the internal combustion engine includes an air snorkel and the engine also includes an exhaust conduit for discharging products of combustion towards the boat to maintain the accessory remote from the boat to the full extent of the connecting line.

16 Claims, 4 Drawing Figures

Patented March 14, 1972

3,648,643

INVENTOR
JEROME MURRAY

BY
Curtis, Morris & Safford
ATTORNEYS

BOATING ACCESSORY

This invention relates to boating accessories and in particular to an accessory adapted to supply electrical power to a boat while it is at sea or at anchor.

In boats, and particularly in relatively small pleasure crafts, electricity for the vessel's lights and appliances must be supplied from some outside source when the vessel's engines are stopped. In a marina, where shore power is available there is no problem since the boat's electrical system is readily connected to the land-based power lines. However, when the boat is at sea, or at anchor, the supply of dependable electricity becomes a serious problem.

In the past, electricity has been supplied to boats at sea by the use of gasoline engine driven generator systems. Generally, the gasoline engines are mounted in the hull and produce serious and troublesome amounts of noise and vibrations. Attempts have been made to overcome these problems by the use of relatively large sound deadening enclosures and specialized vibration dampening mounting systems. While these solutions have succeeded in muffling or limiting the attendant noise and vibrations of the boat's electrical supply system, they have been found to be relatively expensive, cumbersome and impractical for use in pleasure crafts.

Accordingly, it is an object of this invention to isolate the attendant noise and vibrations of a boat's electrical supply system from the boat itself. It is another object of the invention to maintain the electrical supply system of a pleasure boat remote from, yet connected to, the boat. It is a further object of the invention to provide a relatively simple and inexpensive boating accessory adapted to supply electricity to a boat free of noise and vibrations associated with the electrical supply system.

In accordance with the preferred embodiment of the invention there is provided a buoyant watertight vessel containing an internal combustion engine and an alternator for producing electrical current. The vessel is moored to a boat by a line which includes the necessary electrical wiring for supplying current from the alternator to electrical appliances on the boat. The vessel is designed to be substantially submerged when in operation so that the surrounding water absorbs most of the noise and vibrations produced by the alternator and its engine.

A snorkel tube is provided on the top surface of the container so that the necessary air is supplied to the engine. The snorkel is provided with a float ball valve for closing the snorkel in the event the snorkel becomes submerged, to prevent water from entering the engine.

The exhaust from the engine is discharged under water to further muffle engine noise and to prevent exhaust gases from entering the snorkel. The exhaust pipe includes a flexible tube which is normally biased towards the bow of the vessel. The products of combustion from the engine are discharged through this pipe in the direction of the boat and thus serve to move the vessel away from the boat to the full extent of the mooring line. In this manner the effects of water currents and wind on the relative positions of the boat and vessel are substantially overcome and the container is kept at a distance from the boat.

The end of the flexible exhaust tube is formed by a pair of generally flat flexible walls in contact with each other so that they form a seal when the engine is stopped to prevent water from entering the engine. When the engine is in operation, however, the discharged products of combustion are under sufficient pressure to expand and separate these walls and are thus discharged into the water.

The vessel may be removed from the water when the boat is underway since, generally, electricity will then be supplied by the boat's generator. Alternatively, the vessel may be streamlined so that it can be towed behind the boat. In this latter case, the water pressure on the flexible exhaust tube will be sufficient to bend it towards the stern so that water is not forced into the exhaust portions of the engine.

The construction of the preferred embodiment as well as further objects and advantages thereof will become further apparent from the following specification when considered in conjunction with the accompanying drawing wherein.

Figure 1:
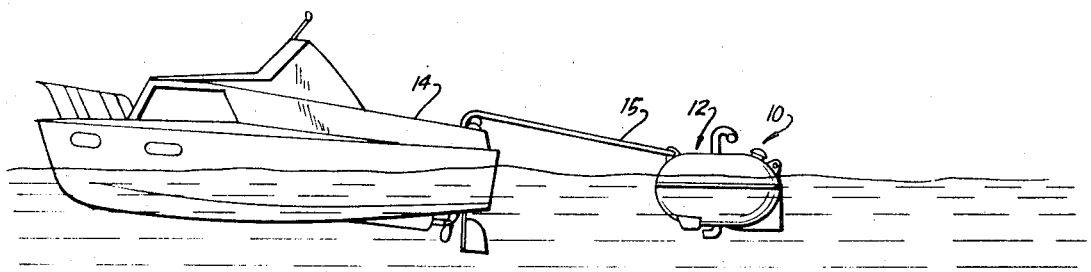
FIG. 1 is an elevational view of a boat having the boating accessory of the present invention attached thereto.

Referring now to the drawings and in particular to FIG. 1, there is disclosed a boating accessory 10 of the preferred embodiment of the present invention including a buoyant watertight vessel 12 partially submerged in the water behind a boat 14 and connected thereto by a mooring line 15. As more fully described hereinafter, vessel 12 includes an internal combustion engine for driving an alternator to produce alternating current for the electrical appliances on board boat 14.

Figure 2:
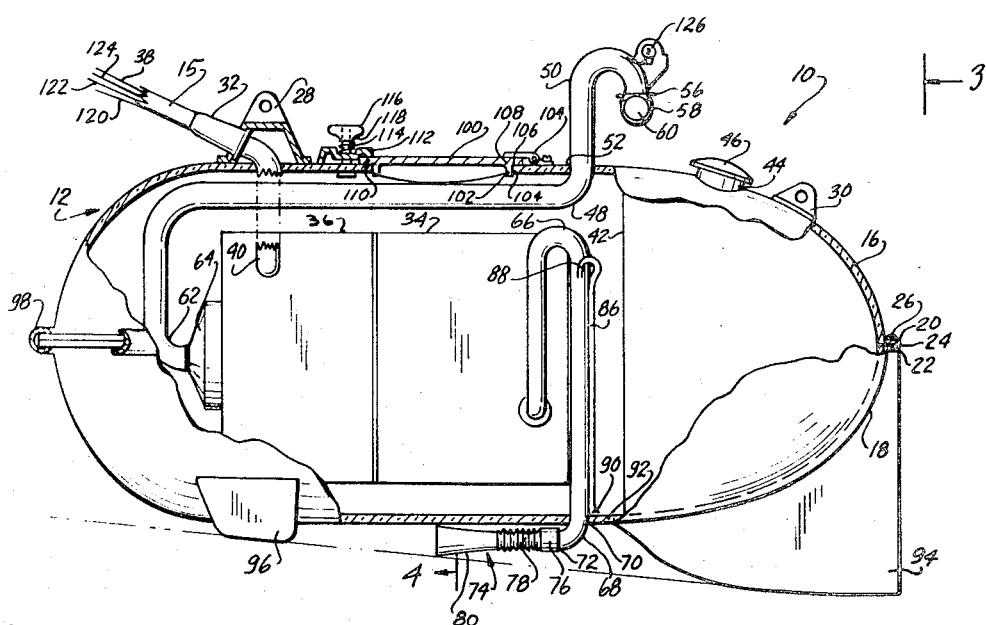
FIG. 2 is a vertical sectional view of the boating accessory shown in FIG. 1.

As seen in FIG. 2, vessel 12 is formed by a pair of fiberglass hull sections 16 and 18 having horizontally extending peripheral flanges 20 and 22, respectively. A water seal gasket 24 is interposed between flanges 20 and 22 which are joined in watertight relation by fasteners 26 to form the completed watertight buoyant hull of vessel 12.

A pair of lifting eyes 28 and 30 are fixed to upper hull section 16 to facilitate raising vessel 12 from the water when it is not in use. Lifting eye 28, at the bow of vessel 12, includes an anchor member 32 to which a portion of mooring line 15 is secured. Anchor 32 resists the tendency of line 15 to be pulled from vessel 12 when the vessel is maintained in tow by boat 14 or is moved away from the boat under the effects of wind or current.

An internal combustion engine 34 which may be driven by either gasoline or diesel fuel oil, is mounted within the central portion of vessel 12 and is operatively connected to an alternator 36 to drive the alternator to produce alternating current. This current is supplied to the electrical appliances on board boat 12 by suitable electrical wiring 38 which extends through mooring line 15. The free end 40 of line 15 extends through anchor member 32 to permit connection of wires 38 to alternator 36 in the conventional manner. The stern portion of the vessel 12 is provided with a gasoline tank 42 which supplies fuel to engine 34 and provides additional ballast to partially submerge the vessel. Tank 42 occupies the entire stern portion of hull sections 16 and 18 and is provided with a conduit 44 which extends through hull section 16 and permits filling of the tank. Conduit 44 is provided with a conventional self venting filler cap 46 to prevent loss of fuel from tank 42.

The air required for combustion is supplied through snorkel tube 48 which has an end portion 50 extending through an opening 52 in hull section 16 to provide communication between the atmosphere and engine 34. Opening 52 may be provided with any conventional sealing means to prevent inadvertent admission of water into vessel 12.

As seen in FIG. 2, end portion 50 of snorkel tube 48 includes an inverted U-shaped portion 54 having a free end 56 opening downwardly to the atmosphere. Free end 56 is provided with a foraminous cage 58 which retains a buoyant ball valve member 60 therein. The diameter of valve member 60 is such that in the event end 56 is submerged, the ball 60 will tend to move upwardly and seal end 56 and prevent water from entering snorkel 48 and engine 34. In normal operating conditions open end 56 of snorkel 48 is above the water level and ball 60 is held in the base of cage 58 by gravity. Thus, end 56 is open for communication with the atmosphere.

Air entering open end 56 of snorkel 48 flows therethrough to the snorkel's other end portion 62 which is connected to the shroud 64 of alternator 36. The air flows through shroud 64 to cool alternator 36 and increase its operating range. After passing through alternator 36, the air is supplied to engine 34 where it is mixed with the fuel supplied from tank 42 in a conventional manner and supplied to engine 34. Shroud 64 may be provided with a conventional air maze or filter (not shown) which is adapted to gather any moisture entering snorkel 48 and drain it from the air stream before the air enters engine 34.

The products of combustion from engine 34 are discharged through an exhaust conduit 66 which includes a discharge-end portion 68 extending through hull section 18 to exhaust the products of combustion below the water line. End portion 68 ends through an opening 70 in hull section 18 which is sealed to prevent admission of water therethrough in a manner similar to opening 52 discussed above. The free end 72 of conduit portion 68 is directed towards the bow of vessel 12 so that as the exhaust gases are discharded therethrough they will move vessel 12 away from boat 14 to the full extent of mooring line 15. Thus, during operation of accessory 10, the vessel 12 will be maintained a substantial distance from the boat 14 and counteract, to a degree, the effects of wind and current on the vessel.

As mentioned previously, vessel 12 is partially submerged, and typically, when fuel tank 42 is filled, 60 percent of the vessel will be below the water line. By thus submerging vessel 12, noise and vibrations resulting from engine 34 are absorbed by the surrounding water and isolated from boat 14. In addition, the noise resulting from operation of the accessory is further muffled and isolated from boat 14 by maintaining vessel 12 remote from boat 14 because of the position of discharge conduit 66.

Figure 4:
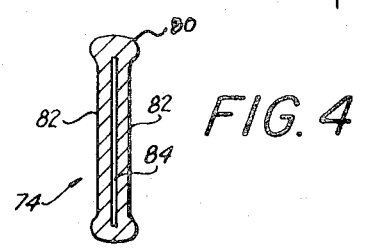
FIG. 4 is a sectional view of the flat exhaust valve taken on line 4—4 of FIG. 2.

Free end 72 of exhaust conduit 68 is provided with a valve member 74 which permits discharge of exhaust gases from conduit 68 in the manner discussed above and also prevents entrance of water into conduit 68 when accessory 10 is not in use. Valve member 74 includes a tubular end portion 76 which receives end 72 of conduit 68 and forms a watertight seal therewith. A flexible central accordian hose portion 78 is also provided in valve member 74, for purposes more fully described hereinafter. Hose portion 78 is reinforced to retain its tubular configuration by a coil spring (not shown) molded therein which also maintains free flow of the products of combustion from conduit 68 through portions 76 and 78 of valve member 74. The discharge end 80 of valve member 74 forms the valve sealing portion thereof, and as seen in the sectional view of FIG. 4, is formed by a pair of generally flat side members 82 which define a slit 84 therebetween. Slit 84 communicates with tubular portions 78 and 76 and permits discharge therethrough of the products of combustion. When engine 34 is operating, the exhaust gases are under sufficient pressure to separate members 82 and permit discharge of the gases therethrough; however, when the engine is not operating side members 82 return to the configuration seen in FIG. 4 wherein slit 84 is closed to prevent passage of water therethrough.

In the event that vessel 12 is taken in tow by boat 14, water pressure reacting against side members 82 bend flexible portion 78 of member 72 away from the direction of movement of the vessel. Thus, engine 34 may be continued in operation even while boat 14 is in motion since slit 84, while opened due to the pressure of the exhaust gases, will be directed away from the direction of travel so that water cannot be forced therethrough.

Vessel 12 is also provided with a self bailing system which includes a venturi syphon tube 86 having one end 88 inserted in exhaust conduit 66 (see FIG. 2) and an opposed end 90 adjacent the bottom or bilge 92 of hull portion 18. As the exhaust gases from engine 34 flow through conduit 66 past tube end 88 the pressure within end 88 is decreased by venturi effects and the pressure differential between the interior of vessel 12 and the tube end 88 is sufficient to cause water collected in bilge 92 to rise in tube 86 for discharge through conduit 66 and valve member 74.

Figure 3:
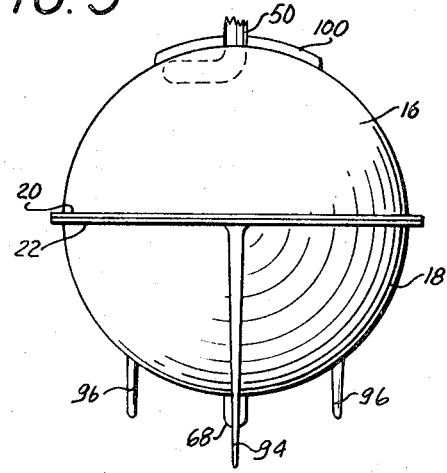
FIG. 3 is an end view of the boating accessory taken on line 3—3 of FIG. 2.

Lower hull section 18 is provided with a main stabilizer fin 94 at its stern which serves to resist capsizing of vessel 12 in extreme wind or current conditions. In addition, fin 94 provides stability when vessel 12 is towed by boat 14. A pair of fins 96 are also provided adjacent the bow of vessel 12 to supplement the stabilizing effects of fin 94 and, in addition, these fins provide a three point support for vessel 12 (as seen more clearly in FIG. 3) when the vessel 12 is removed from the water and mounted on the deck of the boat for storage.

In addition to resisting effects of wind and current, fins 94 and 96 cooperate with flanges 20 and 22, which are submerged when the accessory is in operation, to resist the tendency of vessel 12 to rotate on its longitudinal axis under the effects of the moving and rotating elements within engine 34 and alternator 36. Peripheral flanges 20 and 22 are enclosed within a generally cylindrical resilient bumper 98 which can be molded on vessel 12. Bumper 98 resists damage to both boat 14 and flange 20, 22 in the event that vessel 12 inadvertently rams the boat while vessel 12 is in the water.

In the embodiment described above, the device for producing electricity has been defined as an alternator, however, it is foreseen that a conventional generator may also be employed if desired. An alternator is preferred, however, since it lacks the commutator of generator systems and thus the possibility of sparking in the device is decreased. This is particularly critical in a closed system such as vessel 12 which contains explosive fuel and fuel vapors.

In order to limit damage to vessel 12 in the event of an inadvertent explosion, and in addition to provide access to the interior of the vessel, a spring latched port 100 is provided in upper hull section 16. Port 100 includes an annular portion 102 which extends into an opening 104 in hull portion 16 and has an annular flange 106 which engages the top surface of the hull. Flange 106 may be provided with a gasket (not shown) for engaging the top surface of hull sections 16 and form a watertight seal therewith. One end 108 of flange 106 is connected to hull section 16 by a pivotal connecting member 107 as seen in FIG. 2, so that port 100 is adapted to open upwardly. Opposed end 110 of flange 108 is retained against hull section 16 by latch member 112 which is mounted to slide vertically on a stud member 114. The top portion of stud 114 includes a stop member 116 which retains coil spring 118 about stud 114 and against latch 112 to spring bias the latch against port 100. To gain access to the interior of vessel 12, latch 112 is merely moved against spring 118 and port 100 may then swing open about pivot 107. Moreover, in the event of an explosion within vessel 12, port 100 will be pushed against latch 112 by the force of the explosion and against the force of spring 118 to raise latch 112 on stud 114 until edge 110 of flange 106 is released to completely open port 100 and relieve the force of the explosion.

As mentioned above, hull sections 16 and 18 of vessel 12 are formed of fiberglass, and these sections are relatively rigid and have relatively high structural strength. The strength of spring 118 is accordingly designed to release port 100 before pressure is built up within the vessel which would be sufficient to fracture the hull sections. In addition, fiberglass is a relatively good thermal conductor and thus is adapted to dissipate the heat created by engine 34 into the surrounding water.

To facilitate operation of accessory 10 from boat 12, mooring line 15 is provided with additional wires to control engine 34. One wire 120 provides an operative connection between a control element on boat 10 and a conventional solenoid control for the choke of engine 34, which is used to start the engine. Engine speed is controlled by the engine's governor in response to electrical load on the alternator, as is conventional. In addition, a common wire 122 is provided for grounding the vessel and a wire 124 is provided for starting the engine from a battery mounted on boat 12. The starter motor (not shown) for engine 34 is of conventional construction and may be designed to remain engaged with engine 34 during operation of the device to produce a limited amount of direct current. This current may thence be supplied to operate running lights positioned on vessel 12, as for example, the running or mooring light 126 mounted on snorkel tube 48.

It is thus seen that novel and effective apparatus is provided for supplying a boat, and in particular a pleasure craft, with electricity, and yet substantially eliminating the noise and vibrations of the electrical producing system from the boat itself.

The above description of the invention is intended to be illustrative only, and various changes and modifications in the embodiments described may occur to those skilled in the art. These changes may be made without departing from the scope of the invention and thus it should be apparent that the invention is not limited to the specific embodiment described or illustrated in the drawing.

What is claimed is:

1. A yachting accessory for supplying electricity to the electrical appliances on a boat and which is adapted to be maintained in a position remote from said boat, comprising, in combination, a buoyant substantially watertight vessel adapted to be substantially submerged in the water and defining a substantially watertight chamber therein, an internal combustion engine mounted in said chamber, means in said chamber, connected to said engine, for producing electrical energy, and a flexible mooring line for connecting said vessel to said boat including electrical wiring for supplying said electrical energy to said appliances, said internal combustion engine including an exhaust conduit for the products of combustion produced in said engine, said conduit extending through said vessel in a position to discharge said products underwater when said vessel is in use, and having valve means for permitting said discharge and for preventing water from entering the conduit, said conduit being directed towards the point of connection of said vessel with said mooring line whereby as said products of combustion are discharged from said conduit, said vessel is urged away from said boat to the full extent of said mooring line.

2. A device as defined in claim 1 wherein said vessel includes, means for supplying air to said engine and valve means for preventing entrance of water into said supply means.

3. A device as defined in claim 2 wherein said supply means comprises, a snorkel tube having one end associated with said engine and a second end communicating with the atmosphere, and said valve means comprises a buoyant ball member adapted to seal said second end when said second end is submerged.

4. A device as defined in claim 1 wherein said vessel includes, a plurality of stabilizer fins adapted to stabilize said vessel in the water.

5. A device as defined in claim 4 wherein said vessel includes, top and bottom sections having mating generally horizontally extending flanges about the periphery thereof and means for joining said flanges in watertight relation, whereby said flanges serve to assist in stabilizing said vessel and to resist the tendency of said vessel to rotate under the influence of said internal combustion engine.

6. A device as defined in claim 5 wherein said flange is covered by a resilient bumper means.

7. A device as defined in claim 1 wherein said means for producing electrical energy comprises, a generator driven by said internal combustion engine.

8. A device as defined in claim 1 wherein said means for producing electrical energy comprises, an alternator driven by said internal combustion engine.

9. A device as defined in claim 8 wherein said alternator supplies alternating current to said appliances through said electrical wiring and said vessel includes, running lights and a starter for said engine, said running lights receiving DC from said starter.

10. A device as defined in claim 1 wherein said mooring line is connected at the bow of said vessel and said exhaust conduit includes, a flexible end portion biased towards the bow of said vessel.

11. A device as defined in claim 10 wherein said valve means comprises, a generally flat resilient tube having a pair of side walls defining a central longitudinally extending slit, communicating with said conduit said side walls being adapted to close said slit to prevent water from entering said conduit and being further adapted to open said slit to permit discharge of said products of combustion when said engine is operating.

12. A device as defined in claim 11 wherein said vessel includes, means for bailing the interior thereof, said bailing means comprising a venturi syphon driven by said products of combustion flowing in said exhaust conduit.

13. A device as defined in claim 1 wherein said vessel includes, a spring biased pivotally mounted port on the upper surface thereof for providing access to said engine and said means for producing electrical energy.

14. A device as defined in claim 1 wherein said internal combustion engine includes, a starter mechanism and a choke, said mooring line including control wires extending from said boat to said starter and said choke whereby said internal combustion engine is adapted to be remotely controlled from said boat.

15. Boating accessory equipment adapted to be maintained in a position remote from its associated boat, comprising, in combination, a buoyant watertight vessel adapted to be placed in the water and defining a substantially watertight chamber therein, said vessel being connected to said boat by a flexible mooring line, an internal combustion engine mounted in said chamber and adapted to drive said accessory equipment, said mooring line being connected to one end of said vessel, an exhaust conduit for the products of combustion formed in said engine, said conduit including a discharge end, and a valve means for permitting said discharge and for preventing water from entering the conduit, said discharge end is directed towards said one end of said vessel and adapted to discharge said products underwater whereby said vessel is urged away from said boat to the full extent of said mooring line.

16. Boating accessory equipment as defined in claim 15 wherein said valve means comprises, a flexible tube member having first and second end portions, said first end portion including a flexible tube section connected to said conduit discharge end and biased towards said one end of said platform, said second end portion comprising a generally flat tube section having a pair of side walls defining a central longitudinally extending slit communicating with said first end portion and said conduit discharge end, said side walls being adapted to close said slit to prevent water from entering said conduit and being further adapted to open said slit to permit discharge of said products of combustion when said engine is operating.

* * * * *